Aug. 23, 1966 J. F. GILMORE 3,268,668

TRANSLATOR SCALING CIRCUIT HAVING FERROMAGNETIC CORE MEANS

Filed Aug. 28, 1963 2 Sheets-Sheet 1

INVENTOR
J. F. GILMORE
BY Lucian C. Canepa
ATTORNEY

3,268,668
TRANSLATOR SCALING CIRCUIT HAVING FERROMAGNETIC CORE MEANS

John F. Gilmore, Hazlet, N.J., assignor to Bell Telephone Laboratories, Incorporated, New York, N.Y., a corporation of New York Filed Aug. 28, 1963, Ser. No. 305,093
22 Claims. (Cl. 179—18)

Figure 1:
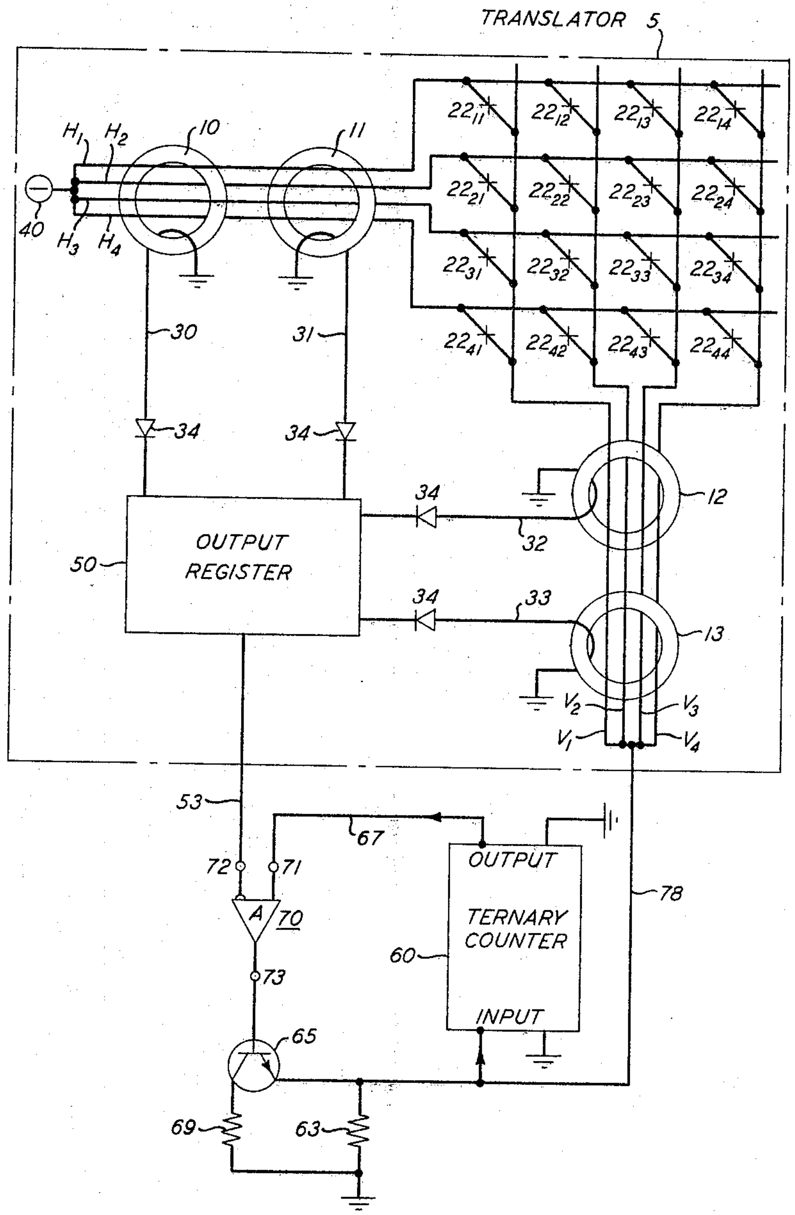

This invention relates to signal translating circuits and, more specifically, to a scaling arrangement which permits an associated circuit to respond to only one of a fixed plurality of input signals supplied thereto.

A plurality of prior art circuit arrangements have been employed to generate encoded binary output signals when supplied with input information. For example, translating circuits of the "Dimond ring" type, as disclosed in T. L. Dimond Patents 2,614,176 and 2,657,272, respectively, issued October 14, 1952, and October 27, 1953, are employed to convert input information represented by an energized one of a plurality of input conductors into output multidigit binary equivalents. Such code translation circuits are useful generally in telephone switching and related fields, and typically comprise a plurality of transformer cores through which individual input conductors are selectively threaded in accordance with binary codes uniquely identifying each input conductor. Thus, a signal appearing on a selected input conductor produces a resultant magnetic flux change in only those cores through which the input conductor is threaded, thereby generating equivalent binary output voltage pulses corresponding to the selected input conductor, in output windings coupled to the cores.

In the employment of the above-described translator circuit as well as in other digital encoding arrangements, it is sometimes desirable to allow only selected input signals to give rise to corresponding encoded output binary information. Such an expedient (referred to as "scaling down") is required, for example, when input signals are received at a faster rate than the resulting encoded output information may be assimilated into the output receiving media. Also, a scaling-down arrangement may be advantageously employed where, because a relatively large number of input signals are involved, the rules of probability dictate that a sampling of the input signals will yield an accurate representation of the identity of the unencoded input data.

It is therefore an object of the present invention to provide an improved scaling circuit.

More specifically, an object of the present invention is the provision of a scaling circuit which permits an associated circuit to respond to only one of a plurality of input impulses supplied thereto.

Another object of the present invention is to provide a highly efficient scaled-down translator circuit which selectively inhibits the generation of output signals, rather than merely preventing the transmission thereof.

It is another object of the present invention to provide a scaling circuit which may be simply and economically constructed, and which is highly reliable.

It is still another object of the present invention that a translator scaling circuit include only a fixed, relatively small number of circuit components independent of the translator capacity.

In accordance with a specific illustrative embodiment of this invention, wherein the above and other objects are obtained, a scaling circuit is employed to constrain a "Dimond ring" type translator, described in a cofiled application designated W. T. Wichman Serial No. 305,094, filed August 28, 1963, to generate only one set of output signals for every three input energizations supplied thereto. The translator as modified comprises a plurality of encoding windings selectively coupled to a plurality of linear ferromagnetic cores, with a relatively large impedance, shunted by a normally nonconductive switching transistor, being serially connected to the windings. The embodiment also includes a ternary counter whose input and output teminals are respectively connected to the impedance and the transistor switch.

The relatively large impedance inhibits the first two input voltage pulses from establishing an appreciable current in the selected encoding windings, and no significant amount of flux is switched in the cores by these signals. However, when the ternary counter detects the presence of the third input, it saturates the switching transistor, hence effectively short-circuiting the impedance and allowing current to flow in the selected winding, thereby generating encoded output information.

It is thus a feature of the present invention that a scaling circuit comprise a current inhibiting element, a normally nonconductive transistor switch connected in parallel with the inhibiting element, and a counter arrangement responsive to the last of a fixed number of input impulses for energizing the switch.

It is another feature of the present invention that a scaled translator arrangement comprise a plurality of encoding windings, a relatively large impedance serially connected to each of the windings, a transistor with the collector and emitter thereof connected to the terminals of the impedance, and a counter arrangement having the input and output terminals thereof respectively connected to one terminal of the impedance and to the transistor base terminal.

Figure 2:
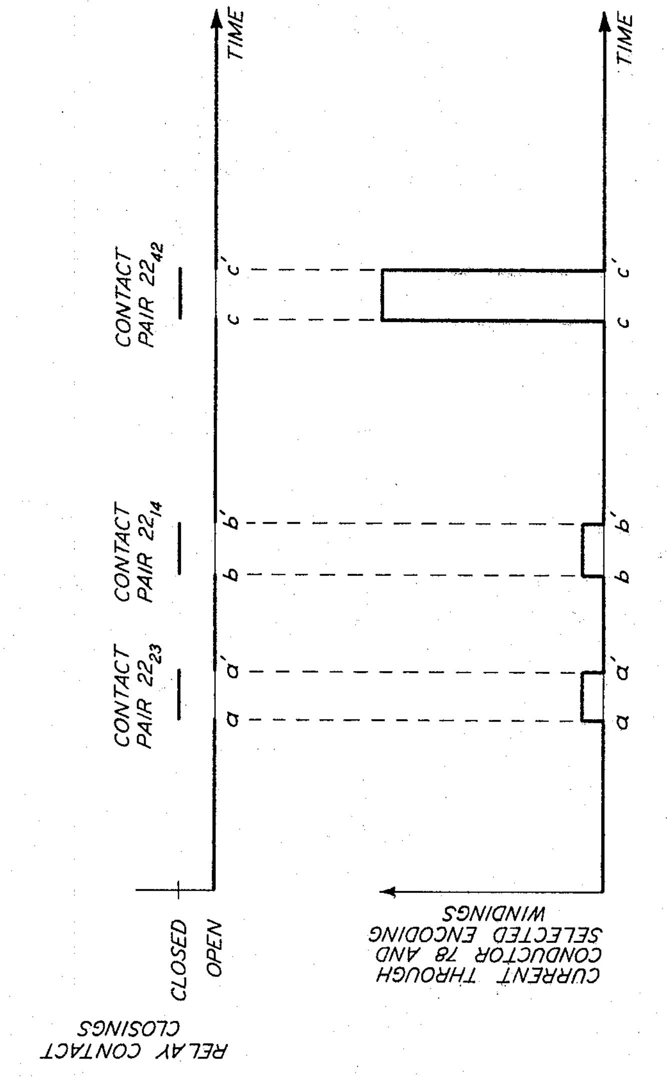

A complete understanding of the present invention and of the above and other features, advantages and variations thereof may be gained from a consideration of the following detailed description of an illustrative embodiment thereof presented hereinbelow in conjunction with the accompanying drawing, in which:

FIG. 1 is a diagram of a specific, illustrative scaled translator arrangement which embodies the principles of the present invention; and FIG. 2 is a diagram which illustrates the timing relationship between selected circuit operations associated with the FIG. 1 arrangement.

An illustrative application in which the present scaling circuit may be employed advantageously is in conjunction with a "Dimond ring" type translation circuit in which telephone traffic data is utilized to monitor a plurality of units of telephone equipment, e.g., markers, senders, trunks, etc. A principal type of traffic data accumulated by such monitoring apparatus relates to telephone equipment usage in terms of traffic volumes, or peg counts. Peg count traffic data is obtained by connecting monitoring apparatus to individual control leads emanating from the various units of the telephone equipment to be observed. When a unit of equipment assumes a predetermined condition, such as through seizure for use, a signal appears on the individual control lead therefrom. A count of the signals appearing on a control lead during a period of observation indicates the volume of seizures of the particular equipment unit for that period. To eliminate the need for intervening manual or clerical processes, it is desirable to accumulate and record these signals in a form suitable for direct processing and summarization by automatic data processing equipment. However, the signals from the various units of equipment being monitored are electrically indistinguishable and cannot be directly recorded on a storage medium, but rather must be encoded in some manner to identify selected signals as to their respective origin. For this purpose an encoder, with an associated scaling arrangement, is interposed between the monitoring apparatus and the recording apparatus. The scaled encoder functions to identify a selected percentage of the signals directed thereto from the monitoring apparatus and provide an equivalent binary code notation particularly designating the equipment units from which the signals emanated. This equivalent code notation is then recorded for subsequent processing by automatic data processing equipment.

Referring now to FIG. 1, there is shown a scaled translator arrangement which comprises a "Dimond ring" type translator 5, more particularly described hereinafter, which is connected to a common ground terminal via a conductor 78 and a series-connected relatively large impedance 63. The collector of a normally nonconductive transistor 65 is connected to ground by a relatively low resistance 69, and the emitter terminal thereof is connected to the ungrounded terminal of the relatively high impedance 63. A gating amplifier 70 is provided with an output terminal 73 connected to the base of the transistor 65. Further, a ternary counting arrangement 60 has the ungrounded input and output terminals thereof respectively connected to the ungrounded terminal of the impedance 63 and to one input terminal 71 of the gating amplifier 70. The counter 60 supplies an output energization to the gating amplifier 70 upon the occurrence of the last of three received input signals. The gating amplifier 70 in turn forward biases the base-emitter input junction of the normally-off transistor 65 upon receiving a signal from the counter 60.

The transistor 5 is described in detail in the aforementioned cofiled Wichman application and comprises a first set of linear, ferromagnetic cores 10 and 11, and a second set of similar cores 12 and 13. A first horizontal plurality of encoding windings $H_1$ through $H_4$ and a second, vertical plurality of encoding windings $V_1$ through $V_4$ are selectively coupled to the first and second core sets. A plurality of output windings 30 through 33 are inductively linked to the cores 10 through 13, respectively, and connected via one of a plurality of rectifying diodes 34 to an output register 50. In addition, a negative voltage source 40 is connected to a first end of each of the horizontal encoding windings $H_1$ through $H_4$. Similarly, a first end of each of the vertical encoding windings $V_1$ through $V_4$ is connected to the conductor 78.

A matrix array of relay contact pairs 22 is provided to connect the second end portion of each of the horizontal encoding windings $H_1$ through $H_4$ to the second end portion of each of the vertical windings $V_1$ through $V_4$. It is noted that the contact pairs 22 are further designated with two subscripts which respectively denote the row and column encoding winding to which they are connected. For example, the reference numeral $\mathbf{22_{34}}$ identifies the contact pair associated with the third row horizontal encoding winding $H_3$ and the fourth column winding $V_4$.

It is noted that the primary relay winding (not shown in FIG. 1) which, when energized, activates an associated one of the contact pairs 22 may be controlled, for example, by a particular piece of telephone equipment whose usage is to be measured, as discussed hereinabove with respect to traffic data monitoring. When the corresponding equipment item is seized for use, a current flows through the primary relay winding thereby closing the related contact pair.

For purposes of discussing the FIG. 1 arrangement, it is sufficient to note regarding the translator 5 that when a selected relay contact pair 22 included therein is closed, a complete direct-current series path between the conductor 78 and the negative source 40 is established via the energized contact pair 22 and selected vertical and horizontal encoding windings.

When an appreciable current is established in the noted series path, flux is switched in those cores which are coupled to the energized horizontal and vertical encoding windings. Responsive thereto, voltage pulses are selectively induced in a unique pattern of core output windings, hence identifying the energized relay. However, when only a small, negligible current is pemitted to flow in the direct-current path completed by the energized relay contact pair 22, only a negligible flux is switched in the associated cores and thus no encoded output information is supplied to the output register 50.

It is noted at this point that a control winding 53 is employed to connect the output register 50 to an inhibiting input terminal 72 included in the gating amplifier 70. The nature and purpose of this control winding 53 will be disclosed hereinafter.

With the above organization in mind, an illustrative sequence of circuit operation for the FIG. 1 translator, which is scaled to provide encoded output information for only one of every three input energizations supplied thereto, will now be described. Prior to the time *a* shown in FIG. 2, the FIG. 1 scaled translator is in its initial quiescent state with no current flowing through any of the encoding windings $H_1$ through $H_4$ or $V_1$ through $V_4$. Assume now that the contact pair $\mathbf{22_{23}}$ is closed at the time *a* responsive to a current flow through the primary relay winding (not shown) associated therewith. This relay energization is represented in the upper curve in FIG. 2.

With the closing of the contact pair $\mathbf{22_{23}}$, a circuit path between ground and the negative source 40 is completed via the relatively high resistor 63, the conductor 78, the vertical encoding winding $V_3$, the contact pair $\mathbf{22_{23}}$, and the horizontal encoding winding $H_2$. Hence, responsive to the closing of relay contact pair $\mathbf{22_{23}}$, a current flows in the above-identified series path. However, the magnitude of the current is essentially determined by the quotient of the voltage supplied by the source 40 divided by the resistance of the relatively high impedance element 63, and hence the resulting current is of a relatively low, insignificant amplitude, as shown for the interval following time *a* in the lower curve in FIG. 2. Thus, as discussed hereinabove, only a small, negligible flux is switched in the cores 10 and 13 which are respectively coupled to the energized windings $H_2$ and $V_3$, thereby inducing only an insignificant output voltage in the output windings 30 and 33 associated with these cores. Thus, responsive to the closing of the relay contact pair $\mathbf{22_{23}}$ at time *a*, no output information is communicated to the output register 50.

It should be appreciated that at time *a* the voltage of the source 40 is effectively impressed at ungrounded terminal of the resistor 63 and this voltage increment thus also appears at the ungrounded input terminal of the ternary counter 60, which responds thereto by registering a count of "1" therein. It is also noted that the relatively low resistor 69 does not shunt the relatively high impedance 63 at time *a*, as the normally nonconductive switching transistor 65 has not been supplied with an input energization by the gating amplifier 70.

The relatively low current flows through the above-identified series path until the time *a'* shown in FIG. 2, when the primary winding associated with the relay contact pair $\mathbf{22_{23}}$ is de-energized, hence separating the contact members. Under these conditions, there is no longer a complete direct current path between the source 40 and ground, and the current previously flowing in the windings $H_2$ and $V_3$ terminates. Hence, for the interval following the time *a'* shown in FIG. 2, the FIG. 1 arrangement has a count of "1" stored in the ternary counter 60 included therein and is in the proper condition to accept a second input signal.

Assume now, that the contact pair $\mathbf{22_{14}}$ is closed at time *b* shown in FIG. 2 responsive to a current flowing through the primary relay winding associated therewith. This relay energization is depicted in the upper curve in FIG. 2. Responsive thereto a completed circuit path, which includes the vertical encoding winding $V_4$, the horizontal winding $H_1$ and the relatively high impedance 63, is completed between ground and the negative source 40. Thus, a relatively low-valued current, shown in the lower curve of FIG. 2 for the interval following time *b*, flows through this series path in the same manner described hereinabove for circuit operation at time *a*. This current is again insufficient in amplitude to switch appreciable flux in the cores 12 and 13 which are coupled to the energized windings $V_4$ and $H_1$, and hence no significant output information is supplied to the register 50. It is noted, however, that a second voltage pulse is at this time impressed across the relatively high impedance 63 and supplied to the ternary counter 60 which thereby stores a count of "2" therein. At the time *b'*, shown in FIG. 2, the contact pair $22_{14}$ is separated thereby terminating current flow in the translator 5.

Assume now, that the contact pair $22_{42}$ is activated at time *c* shown in FIG. 2, hence establishing a direct-current series path between the ungrounded terminal of the resistor 63 and the source 40 via the conductor 78, the vertical encoding winding $V_2$, the contact pair $22_{42}$ and the horizontal winding $H_4$. Responsive thereto, the voltage of the source 40 is impressed across the relatively high impedance 63, and thus a third input voltage pulse is supplied to the ternary counter 60. When the ternary counter detects the third input pulse, it supplies a signal of a longer time duration than the closure period of the contact pair $22_{42}$ to the input 71 of the gating amplifier 70 via the lead 67. The gating amplifier 70, upon receiving the input signal on the terminal 71 thereof, forward biases the base-emitter junction of the transistor 65 which is under these conditions rendered highly conductive, thereby being characterized by a very low impedance between the emitter and collector terminals thereof. Hence, the switching transistor 65 effectively connects the relatively low resistor 69 in parallel with the relatively high resistor 63, thereby providing a relatively low impedance between the conductor 78 and ground and thereby also between the source 40 and ground. Thus, for the interval following time *c*, a relatively large current, equal in magnitude to the quotient of the voltage supplied by the source 40 divided by the relatively low resistance of the element 69, flows in the above-identified completed series path which includes the encoding windings $H_4$ and $V_2$. This current, shown in the lower curve in FIG. 2 for the interval following time *c*, is sufficient in amplitude to switch an appreciable amount of flux in the cores 10, 11 and 12 which are inductively linked to the energized windings $H_4$ and $V_2$. Thus, flux is switched in the cores 10 through 12, and output voltages are induced in the output windings 30 through 32 associated therewith. The positive output pulses generated in the three windings 30 through 32, along with the absence of a pulse appearing in the output winding 33, are transmitted via the respective series-connected diodes 34 to the output register 50, thereby yielding a unique binary encoding which specifically identifies the relay contact pair $22_{42}$.

The current persists through the above-mentioned series path until time *c'* shown in FIG. 2, when the primary winding associated with the relay contact pair $22_{42}$ is de-energized, hence separating the contact members and interrupting the direct-current path. Responsive thereto, the relatively high current previously flowing in the FIG. 1 arrangement is terminated. Hence, following the time *c'* shown in FIG. 2, the FIG. 1 scaled translator resides in its proper initial condition, ready to initiate a new cycle of operation.

Thus, the FIG. 1 scaled translator arrangement has been shown to be unresponsive to the first two input signals supplied thereto, each signal being manifested by the closure of one of a plurality of relay contact pairs, and to generate a set of encoded output signals upon the occurrence of the third input signal.

It has been previously noted that a control lead 53 connects the output register 50 with the inhibiting input terminal 72 of the gating amplifier 70. The function of this interconnection is to inhibit the gating amplifier 70 from enabling the transistor 65 when the register 50 already has information included therein and is not in a proper condition to accept additional data. Hence, when a control signal is supplied via the control lead 53 to the amplifier 70, the amplifier will not respond to any signal supplied thereto from the counter 60 via the lead 67, which signal would otherwise result in encoded data being generated by the translator 5.

Summarizing, an illustrative scaling arrangement made in accordance with the principles of the present invention is employed to constrain a peg count encoder of the "Dimond ring" type to generate only one set of output signals for every three input energizations supplied thereto. The encoder as modified comprises a plurality of encoding windings selectively coupled to a plurality of linear ferromagnetic cores, with a relatively large impedance, shunted by a normally nonconductive switching transistor, being serially connected to the windings. The arrangement also includes a ternary counter whose input and output terminals are respectively connected to the impedance and the transistor switch.

The relatively large impedance inhibits the first two input voltage pulses from establishing an appreciable current in the selected encoding windings, and no significant flux is switched in the cores by these signals. However, when the ternary counter detects the presence of the third input, it saturates the switching transistor, hence effectively short-circuiting the impedance and allowing current to flow in the selected winding, thereby generating encoded output information.

It is to be understood that the above-described arrangement is only illustrative of the application of the principles of the present invention. Numerous other arrangements may be devised by those skilled in the art without departing from the spirit and scope of this invention. For example, while a one-out-of-three scaler was illustrated for the purpose of clarity, any scaling ratio might well have been employed. In general, for a scaling arrangement which yields output data only once for every *n* input energizations supplied thereto, the counter 60 employed in the FIG. 1 arrangement would be designed to yield one output signal for every *n* voltage pulses supplied to the input terminals thereof.

What is claimed is:

1. In combination, a relatively high impedance having two terminals, at least one encoding winding connected to one terminal of said impedance, a transistor including base, emitter and collector terminals, said transistor collector and emitter terminals being connected to the respective terminals of said impedance, and a counting circuit including input and output terminals respectively connected to said one terminal of said impedance and to said transistor base terminal.

2. A combination as in claim 1, further comprising a gating amplifier connected between said base terminal of said transistor and said counter output terminal.

3. A combination as in claim 2, wherein said gating amplifier includes an inhibiting input terminal and a control conductor connected to said inhibiting input terminal.

4. In combination in a scaled translator circuit, a first and second core set, a first plurality of windings each selectively coupled in a unique manner to said first core set, a second plurality of windings each selectively coupled in a unique manner to said second core set, first switching means for interconnecting said first and second windings, a relatively high impedance having two terminals, said impedance being serially connected to each of said first windings, second switching means connected in parallel with said relatively high impedance, a counting circuit including input and output terminals respectively connected to one terminal of said impedance and to said second switching means.

5. A combination as in claim 4, wherein said second switching means comprises a transistor including collector and emitter terminals which are connected to the respective terminals of said impedance.

6. A combination as in claim 5, further comprising an energy source serially connected to each of said second encoding windings.

7. In combination, a first and second digital encoder each including a plurality of encoding conductors, first switching means for connecting each of said conductors associated with said first encoder to each of said conductors associated with said second encoder, current inhibiting means serially connected with said conductors associated with said first encoder, means for supplying input signals to said first switching means, second switching means connected in parallel with said current inhibiting means, and counter means connected to said second switching means responsive to a fixed number of input signals being supplied to said first switching means for activating said second switching means.

8. A combination as in claim 7, wherein said current inhibiting means comprises a relatively high impedance having two terminals.

9. A combination as in claim 8, wherein said second switching means comprises a transistor including emitter and collector terminals which are respectively connected to the terminals of said impedance.

10. A combination as in claim 9, wherein said transistor further includes a base terminal, and wherein said counter arrangement includes input and output terminals respectively connected to one terminal of said impedance and to said transistor base terminal.

11. A combination as in claim 10, further comprising a relatively small resistor connected between said transistor collector terminal and the other terminal of said impedance.

12. A combination as in claim 11, further comprising an energy source serially connected to said windings associated with said second encoder.

13. A combination as in claim 10, further comprising an output register, and a plurality of output conductors each included in one of said encoders and connected to said register.

14. A combination as in claim 13, further comprising a gating amplifier connected between said counter output terminal and said transistor base terminal, an inhibiting input terminal included in said amplifier, and a control lead connecting said output register and said amplifier inhibiting terminal.

15. In combination, a first and second set of ferromagnetic cores, a first and second plurality of windings each winding including a first and second terminal, each of said first plurality of windings and each of said second plurality of windings being selectively coupled to cores included in said first and second sets, respectively, an energy source connected to said first terminal of each of said first plurality of windings, a relatively high impedance connected to said second terminals of each of said second plurality of windings, said impedance having two terminals, a plurality of switching means connecting said second terminal of each of said first plurality of windings to said first terminal to each of said second plurality of windings, a transistor including base, emitter and collector terminals, said transistor emitter and collector terminals being respectively connected to the terminals of said impedance, and a counting circuit including input and output terminals respectively connected to one terminal of said impedance and to said transistor base terminal.

16. A combination as in claim 15, further comprising a relatively low impedance included in the connection between said transistor collector terminal and the other terminal of said relatively high impedance, and a gating amplifier included in the connection between said transistor base terminal and the output terminal of said counting circuit.

17. A combination as in claim 16, further comprising an output register, a plurality of output windings each coupled to a different core and connected to said output register, an inhibiting terminal included on said gating amplifier, and a control lead connecting said output register and said amplifier inhibiting terminal.

18. In combination, a plurality of conductors, current inhibiting means serially connected to each of said conductors, input means for sequentially supplying a voltage increment to selected ones of said conductors, switching means connected in parallel with said current inhibiting means, and counter means connected to said switching means responsive to a plurality of input signals supplied by said input means for activating said switching means.

19. A combination as in claim 18, further comprising a plurality of ferromagnetic cores selectively coupled to said conductors, an output register, and a plurality of output windings each coupled to a different core and connected to said output register.

20. A combination as in claim 18, further comprising a blocking amplifier, including an inhibiting input terminal, connected between said switching means and said counter, and a control lead connecting said amplifier inhibiting input terminal with said output register.

21. In combination, a source of input signals, an operational circuit responsive to each input supplied by said input source, means connected to said circuit for inhibiting the operation thereof, switching means connected to said inhibiting means for negating the effect of said inhibiting means, and counting means connected to said switching means responsive to the occurrence of the last of a fixed number of input signals supplied by said input source for activating said switching means.

22. The combination as in claim 21, wherein said operational circuit comprises a translator including a plurality of encoding windings, and said inhibiting means comprises a relatively high impedance connected in series with said windings.

References Cited by the Examiner

UNITED STATES PATENTS

| | | | |
|---|---|---|---|
| 2,834,836 | 5/1958 | Hartley | 179—18 |
| 3,153,228 | 10/1964 | Winkler | 340—347 |

KATHLEEN H. CLAFFY, *Primary Examiner.*

L. A. WRIGHT, *Assistant Examiner.*